(12) United States Patent
Leppo et al.

(10) Patent No.: US 6,362,597 B2
(45) Date of Patent: *Mar. 26, 2002

(54) POWER DISTRIBUTION IN A PORTABLE DEVICE

(75) Inventors: Lee Edward Leppo; Martin M. Weiss, both of The Woodlands; Prashant A. Solanki, Houston, all of TX (US)

(73) Assignee: Telxon Corporation, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/753,523

(22) Filed: Jan. 3, 2001

Related U.S. Application Data (63) Continuation of application No. 09/510,829, filed on Feb. 23, 2000, now Pat. No. 6,172,478.

(51) Int. Cl.$^7$ .............................................. H01M 10/46
(52) U.S. Cl. ...................................... 320/116; 320/119
(58) Field of Search ................................ 320/103, 116, 320/118, 119, 128

(56) References Cited

U.S. PATENT DOCUMENTS 5,933,812 A    8/1999  Meyer et al. ................. 705/15
6,172,478 B1 *  1/2001  Leppo et al. ................ 320/116

* cited by examiner

Primary Examiner—Edward H. Tso
(74) Attorney, Agent, or Firm—Amin & Turocy, LLP (57) ABSTRACT

A power distribution system is provided for distributing power in a portable device being coupable to a charging system and including a main battery power and a bridge battery power. The charging system is coupled to a power bus through a diode. The main battery power system and the bridge battery system are also both coupled to the power bus through diodes. The predetermined voltage level is set with respect to the charging system, the main battery and the bridge battery, such that if all three are coupled to the bus, the recharging system both powers the unit and recharges the main battery. If the recharging system is removed, the main battery power system powers the portable device, and if the main battery power system is removed the bridge battery will provide power to the portable device. The distribution system also includes a monitoring system for measuring the predetermined charge level on the battery and disabling a FET switch, so that the main battery stops charging to protect the main battery against overcharging. A monitoring system is also provided for monitoring the voltage level of the main battery utilizing a comparator system.

35 Claims, 7 Drawing Sheets

POWER DISTRIBUTION IN A PORTABLE DEVICE

CROSS REFERENCE TO RELATED APPLICATION

The present application is a continuation application of U.S. patent application Ser. No. 09/510,829, filed Feb. 23, 2000 now U.S. Pat. No. 6,172,478, and entitled POWER DISTRIBUTION IN A PORTABLE DEVICE.

TECHNICAL FIELD

The present invention relates to a portable devices and more particularly to a low cost power distribution system and method for a portable device that is powered by a recharger unit or alternatively a rechargeable battery. The portable device includes a bridge battery for powering the portable device in the event the rechargeable battery is removed.

BACKGROUND OF THE INVENTION

Portable electronic devices (e.g. notebook computers, cellular telephone, cordless telephones mobile data terminals, radio frequency portable communication devices, etc.) typically include a rechargeable battery that is charged by a recharging unit plugged into an AC power source, such as that found in conventional 115 VAC lines. The recharging unit powers the portable device, while simultaneously charging the rechargeable battery. The portable device switches over to battery power upon removal of the portable device from the charging unit or the power source. Most intelligent portable devices employ a bridge battery that is utilized during the removable of the main rechargeable battery when it powers the portable device. The main function of the bridge battery is to insure that data stored in a Random Access Memory (RAM) device is not lost during swapping of the rechargeable battery. The bridge battery is usually a much smaller battery because during a battery swap, the portable device normally will enter a low current or suspend mode, so that most current drawn from the bridge battery is used to refresh the RAM device, until a new main battery is installed into the device.

Many portable devices employ complicated switching or logic circuitry when changing from the rechargeable device power to the main battery power, and from the main battery power to the bridge battery power. The switching or logic circuitry takes up valuable space on a circuit board that could be utilized to perform the function of the portable device. In some cases, additional circuit boards are necessary to house the switching or logic circuitry. This increases the size and cost of the portable device. Furthermore, some of these portable devices employ expensive power management and supervisory circuitry to cause the functional components in the portable device to enter different modes, depending on the type of unit powering the portable device or the current status of the unit powering the portable device. The additional power management and supervisory circuitry adds to the size, the cost and also to the complexity of the portable device.

Accordingly, there is a strong need in the art for a system and/or method that can provide power distribution for a portable electronic device at low cost, while reducing space utilized in employing such a system.

SUMMARY OF THE INVENTION

According to a preferred embodiment of the present invention, a power distribution system is provided for distributing power in a portable device being coupleable to a charging system and including a main battery power system and a bridge battery power system. The charge system is coupled to a power bus through a diode. The main battery power system and the bridge battery system are also both coupled to the power bus through diodes. A predetermined voltage level is set with respect to the charging system, the main battery and the bridge battery such that if all three are coupled to the bus, the recharging system both powers the unit and recharges the main battery. If the recharging system is removed, the main battery power system powers the portable device, and if the main battery power system is removed, the bridge battery will provide power to the portable device. The distribution system also includes a monitoring system for measuring a predetermined charge level on the battery and disabling a FET switch, so that the main battery stops charging to protect the main battery against overcharging. A monitoring system is also provided for monitoring the voltage level of the main battery utilizing a comparator system. Accordingly, the present invention provides for a very low cost power distribution system for portable devices.

Thus, according to one aspect of the present invention, a power distribution system is provided that provides power to functional and power circuitry on a portable device. The system includes a main battery system coupled to a power bus through a first switch system and a charging system coupled to the power bus through a second switch system. The charging system provides power to the power bus through the second switch system while the charging system is coupled to the second switch system and the main battery system provides power to the power bus through the first switch system upon removal of the charging system.

In accordance with another aspect of the present invention a power distribution system is provided that provides power to functional and power circuitry on a portable device. The system includes a main battery system coupled to a power bus through a main battery diode and a bridge battery system coupled to the power bus through a bridge battery diode. The voltage level of the bridge battery is lower than the voltage level of the main battery and removal of the main battery system causes the second switch system to allow the bridge battery system to provide power to the power bus.

In accordance with yet another aspect of the present invention, a method is provided for power distribution in a portable device including a power bus coupled to a device power and functional circuitry. The method includes the steps of providing a main battery system coupled to a power bus through a main battery diode, providing a charging system coupled to the power bus through a charger diode and providing a bridge battery system coupled to the power bus through a bridge battery diode wherein the charging system has a voltage level above the main battery voltage level and the main battery has a voltage level above the bridge battery, such that the charger powers the power bus if the charger is present, the main battery powers the power bus if the charger is not present and the bridge battery powers the bus if the charger and the main battery are not present.

In accordance with another aspect of the present invention, a power distribution system is provided that provides power to functional and power circuitry on a portable device. The system includes means for providing main battery power. The means for providing main battery power includes means for coupling the means for providing main battery power to a power bus. The system also includes means for recharging the means for providing main battery power. The means for recharging the means for providing main battery power includes means for coupling the means for recharging to the power bus. The means for charging having a voltage level that is at a predetermined level above a voltage level of the means for providing main battery power causing the means for charging to simultaneously provide power to the power bus and recharge the means for providing main battery power.

In accordance with yet another aspect of the present invention, a power distribution system for providing power to functional and power circuitry on a portable device is provided. The system includes a main battery system coupled to a power bus through a main battery diode, a charging system coupled to the power bus through a charger diode and a bridge battery system coupled to the power bus through a bridge battery diode. The charging system has a voltage level that is at a predetermined level above a voltage level of the main battery system and the voltage level of the bridge battery system is lower than the voltage level of the main battery system. If the charging system is present, the charger diode is forward biased and the charging system provides power to the power bus. If the charging system is not present, the main battery diode becomes forward biased and the main battery system provides power to the power bus. If the charging system and the main battery system are not present, the bridge battery diode becomes forward biased and the bridge battery system provides power to the power bus.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

Figure 1A:
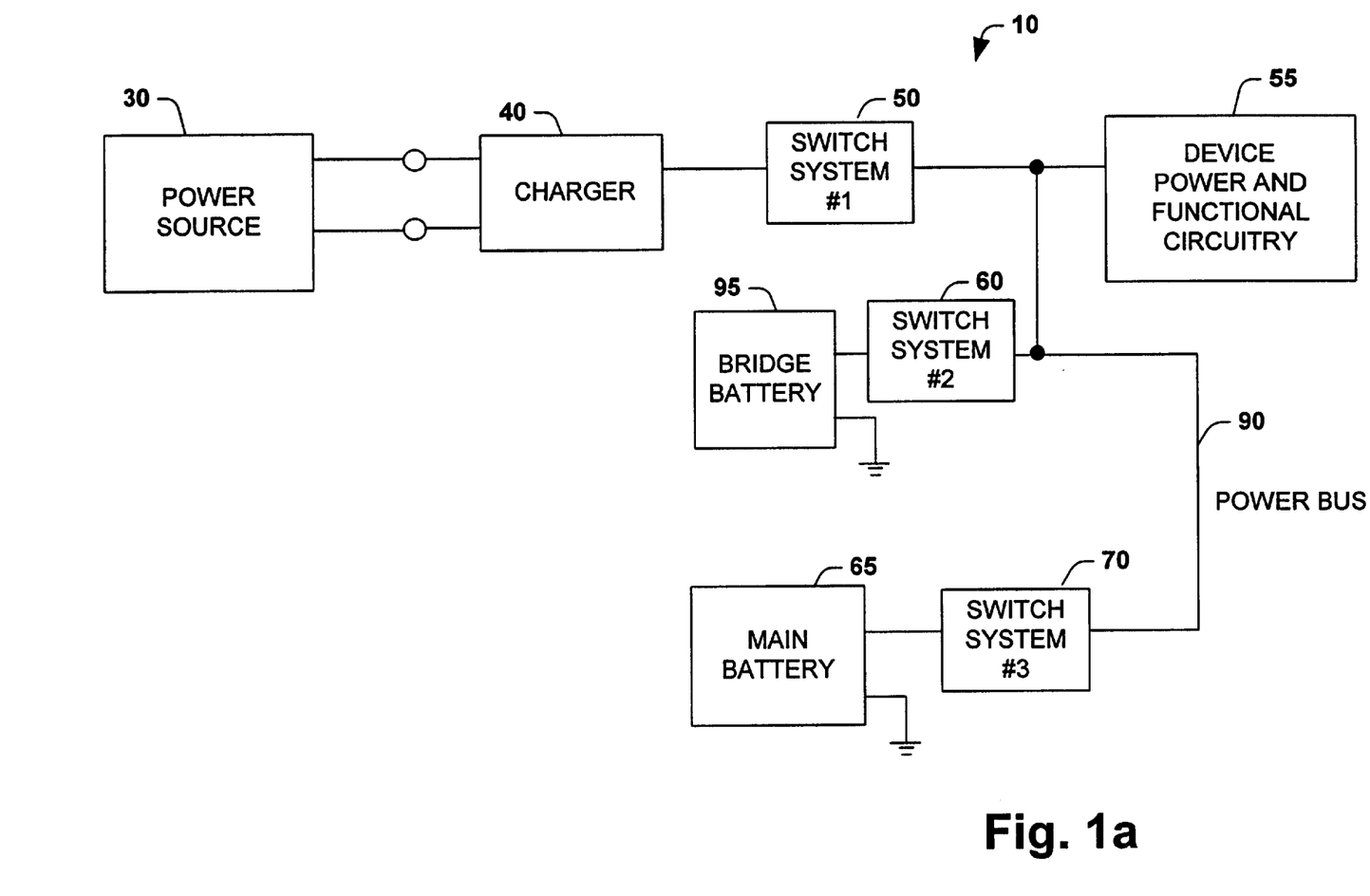
FIG. 1a illustrates a block diagram of a portable device coupled to a power source in accordance with one aspect of the present invention.

Referring initially to FIG. 1a, a portable device 10 is provided with a charger 40 coupled to a power source 30. The source 30 is preferably AC power and operates at an AC power line frequency of 60 Hz. However, it is appreciated that in other countries different line frequencies (e.g., 50 Hz) may be employed. The charger 40 provides power to a power bus 90 for use with powering device power and functional circuitry 55 and recharging a main battery 65. The charger 30 is coupled to the power bus 90 through a first switch system 50. A bridge battery 95 is provided coupled to the power bus 90 through a second switch system 60. The main battery 65 is coupled to the power bus 90 through a third switch system 70. The charging system 40 powers the portable device 10 while the power source 30 is connected to the charger 40. The first switch system 50 provides power to the power bus 50, when the power source 30 is connected. After the power source 30 is removed, the first switch system 50 disables and the third switch system 70 allows power to be provided to the power bus 90 from the main battery 65. If the main battery is disabled, the third switch system 70 disables and the second switch system 60 allows power to be provided to the power bus 90 from the bridge battery 95.

Figure 1B:
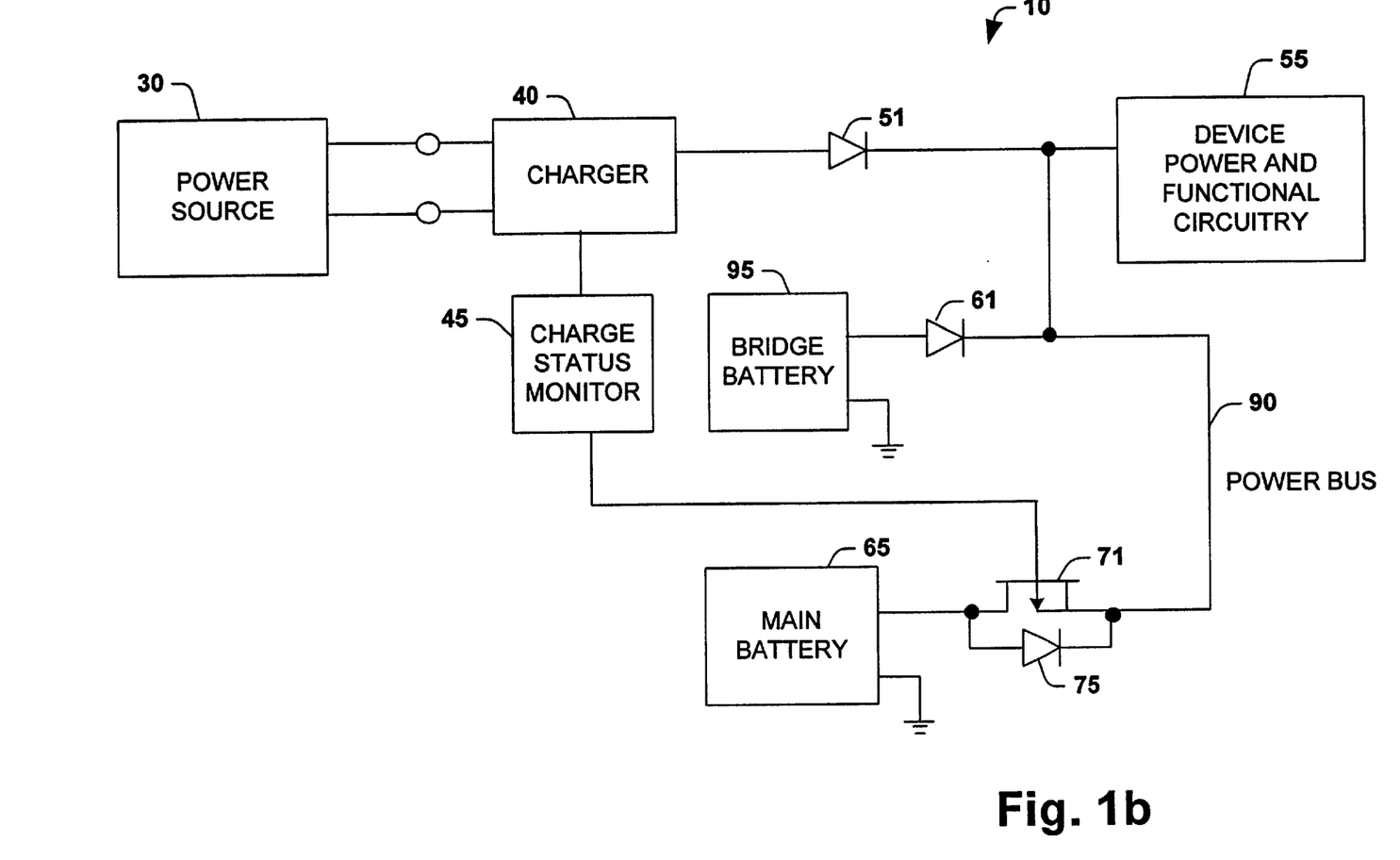
FIG. 1b illustrates a block diagram of a portable device coupled to a power source in accordance with another aspect of the present invention.

In a preferred aspect of the invention, the first switch system 50 and the second switch system 60 are replaced with diodes and the third switch system 70 is replaced with a diode and FET combination. Referring now to FIG. 1b, the portable device 10 is provided with the charger 40 coupled to the power source 30. The charger 40 provides power to the power bus 90 for powering unit or device power and functional circuitry 55 and recharging the main battery 65. The charger 40 is coupled to the power bus 90 through a charger diode 51. The charger diode 51 begins conducting when the power source 30 is connected to the charger 40. Preferably, the charger is a lithium ion charger. However, it should be appreciated that the charger could be other types of chargers beside lithium, depending on the type of battery being recharged. The main battery 65 is coupled to the power bus 90 through a main battery diode 75. The main battery diode 75 is connected to a Field Effect Transistor (FET) switch 71 in a parallel relationship. The opening and closing of the FET switch 71 is controlled by a charge status monitor 45. The charge status monitor 45 could include a timer circuit that begins counting when the charger 40 begins operation by being connected to the power source 30. The timing circuit could include a processor (not shown), such as Intel's 8 bit microcontroller, the 8031, 8051 or 8052. Furthermore, the manner in programming the processor to operate the invention according to the description herein will be apparent to those skilled in the art of computer programming. The FET switch 71 is closed upon detection of power to the charger 40 allowing the charger 40 to charge the main battery 65. After a predetermined amount of time, the charge status monitor 45 changes the state of the FET switch 71, so that the FET switch 71 enters an open state and stops charging the main battery 65.

The removal of power source 30 causes the charger diode 51 to stop conducting. This causes the charger 40 to stop charging the main battery 65 and to stop providing power to the device power and functional circuitry 55. Turning off the lithium charger 40 results in a voltage drop on the power bus 90. The positive voltage drop between the main battery 65 and the power bus 90 causes the main battery diode 75 to begin conducting, such that the device power and functional circuitry 55 are powered by the main battery 65. It is well known in the art that a diode becomes forward biased when a voltage drop of about 0.6–1.0 volts, depending on the type of diode, is provided from a cathode side to an anode side causing the diode to conduct and resemble a short circuit. Furthermore, the diode resembles an open circuit if the voltage drop is less than 0.6–1.0 volts or is a positive voltage drop from the anode to the cathode.

The bridge battery 95 is provided coupled to the power bus 90 through a bridge battery diode 61. The bridge battery 95 is provided to supply power to the portable device 10 in the event that the main battery 65 fails or is being replaced. The bridge battery 95 is a much smaller battery than the main battery 65 and functions to provide current mostly to a RAM device within the device power and functional circuitry 55. The other circuitry utilized in the portable device 10 operates in the suspend or low current mode, so that only a small amount of current is necessary to continue operation of the portable device 10. For example, the bridge battery 95 typically may provide 1–1.2 millamps of current to the portable device 10 when it operates in the suspend mode, while the main battery 65 may be supplying 1–1.2 amps during normal operation of the portable device 10.

The main battery 65 is preferably at a voltage range of between 3–4.2 volts with a nominal voltage of 3.6 volts, while the voltage range of the bridge battery is preferably at 2–3.2 volts with a nominal voltage of 2.4 volts. In the event that the main battery 65 is removed or malfunctions, the main battery diode 75 stops conducting. This results in a voltage drop on the power bus 90. The positive voltage drop between the bridge battery 95 and the power bus 90 causes the bridge battery diode 61 to begin conducting, such that the device power and functional circuitry 55 are powered by the bridge battery 95. If the main battery 65 is replaced, the voltage level on the bus rises above the voltage of the bridge battery and causes the bridge battery diode 61 to stop conducting. Thus, by utilizing diode coupling to the power bus 90, a power distribution system is provided that is inexpensive, takes up very little room on a circuit board, and is simple to fabricate.

Figure 2:
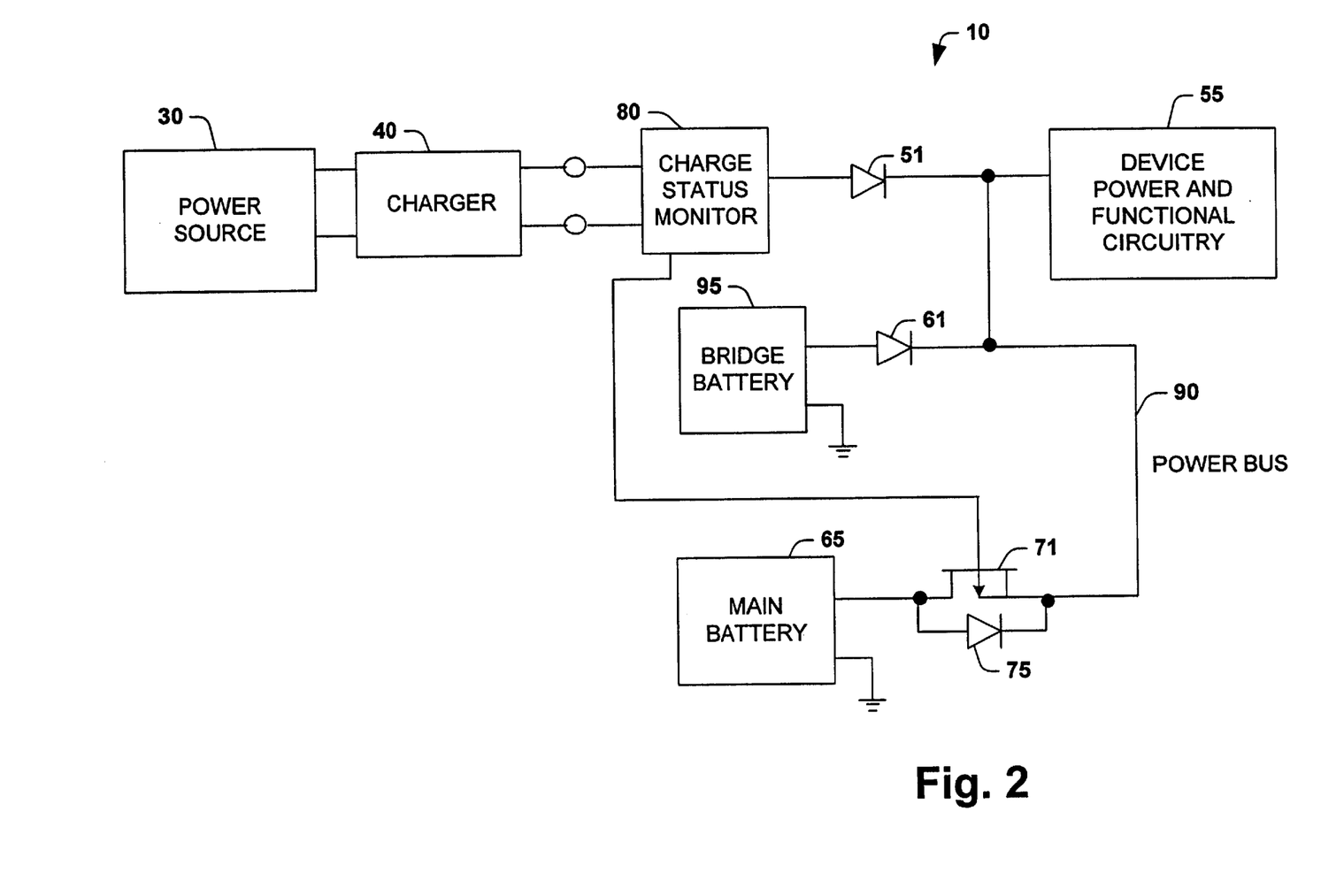
FIG. 2 illustrates a block diagram of a portable device coupled to a charger in accordance with another aspect of the present invention.

It should be appreciated that the lithium charger 40 could be a separate unit from the portable device 10. For example, FIG. 2 illustrates a system where the charger 40 is a separate device coupled to the portable device 10 via a charge status monitor 80. In this embodiment of the invention, the charge status monitor 80 monitors the charge current of the battery utilizing conventional current sensing techniques. If the charge current drops to a certain level indicating that the main battery 65 has become fully charged, the charge status monitor 80 will alternate the state of FET switch 71 causing the switch to open. The charge status monitor 80 could monitor the temperature of the main battery 65 to determine if it has reached full charge capability. It should be noted that the charger 40 could take the form of a conventional cradle device that the portable device 10 rests in, as it recharges.

Figure 3:
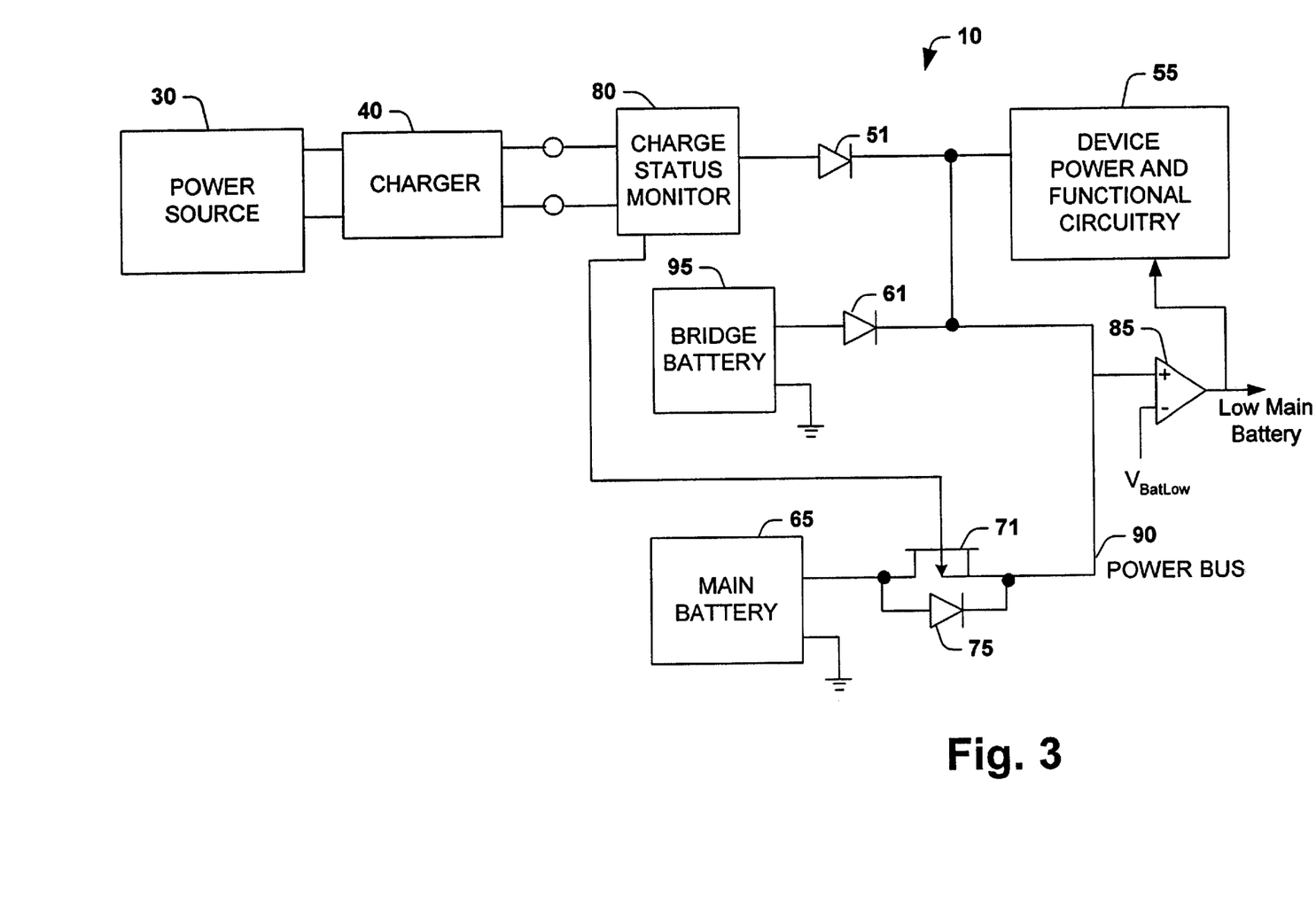
FIG. 3 illustrates a block diagram of a portable device including a low battery voltage monitor in accordance with the present invention.

Referring to FIG. 3, the portable device 10 could include a low main battery power warning system. The portable device 10 could utilize a comparator 85 to monitor the voltage level of the power bus 90. In the embodiment shown in FIG. 3, the positive terminal of the comparator is connected to the power bus 90, while the negative terminal of the comparator 85 is connected to a reference voltage labeled as $V_{BatLow}$. The output of the comparator 85 labeled as "Low Main Battery" changes state when the voltage level on the power bus 90 drops below the reference signal. The output signal can be coupled to the unit power and functional circuitry 55 to perform a power down routine on the portable device 10 or cause the portable device to enter the suspend mode. The output signal can also be coupled to a display or a Light Emitting Diode (LED) to provide a visual warning to the user.

Figure 4:
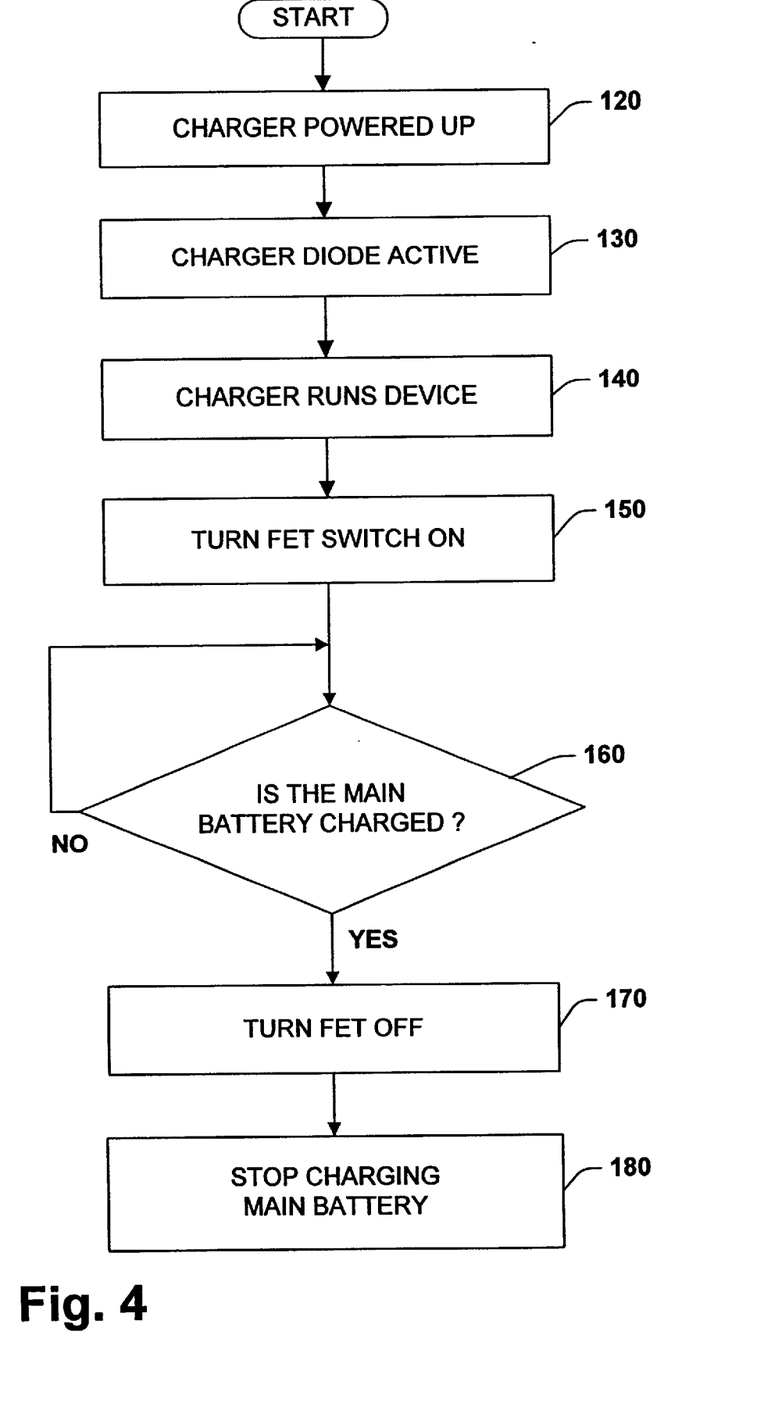
FIG. 4 illustrates a flow diagram for providing power to the portable device and the rechargeable main battery in accordance with the present invention.

FIG. 4 illustrates the steps taken by the present invention to insure that the charger 40 provides power to the unit power and functional circuitry 55, and also performs the function of recharging the main battery 65 when the charger 40 is operably coupled to the power bus 90 via the diode 51. Beginning in step 120, the portable device 10 is coupled to the charger 40 and the charger 40 is powered up. This may be accomplished by coupling the portable device 10 to the power source 30, as shown in FIGS. 1a–1b, or by coupling the portable device 10 to the charger 40, as shown in FIGS. 2–3. This depends on whether or not the charger 40 is a separate unit from the portable device 10 or is part of portable device 10. In step 130, the charger diode 51 begins conducting because the voltage level produced by the charger is above the voltage level of the main battery 65 and the bridge battery 95 causing the charger diode 51 to become forward biased and begin conducting. In step 140, the charger provides power to the power bus 90 and runs the portable device 10. In step 150, the FET switch 71 is turned on, which allows the charger 40 via the power bus 90 to provide current to the main battery 65, thus recharging the main battery 65. The charge status monitor 80 monitors the charge provided to the main battery 65 from the charger 40. As previously discussed, the charge status monitor 80 could monitor the charge by utilizing a timer device or monitor the current draw utilizing conventional current measurement techniques. The charge status monitor 80 determines if the main battery 65 has met a predetermined charge level at 160. If no, the charger 40 continues charging the main battery 65. If yes, the charge status monitor turns the FET switch 71 off in step 170, such that the main battery 65 stops charging in step 180.

Figure 5:
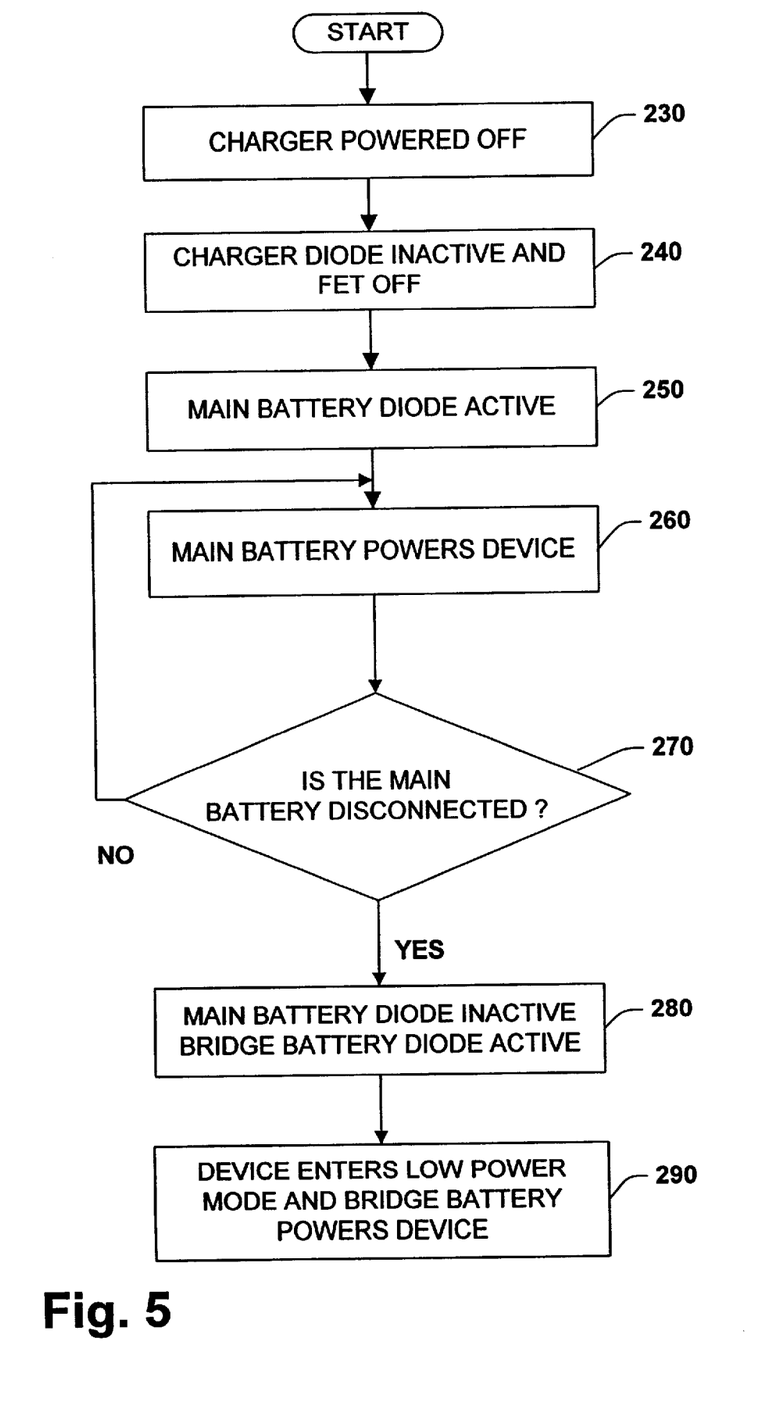
FIG. 5 illustrates a flow diagram for providing bridge battery power to the portable device in the event of removal of the main battery power in accordance with the present invention.

FIG. 5 illustrates the steps taken by the present invention to insure that the main battery 65 provides power to the unit power and functional circuitry 55 if the charger 40 is removed, and also that the bridge battery provides power to the unit power and functional circuitry 55 if the charger 40 and the main battery 65 are removed. Beginning in step 230, the charger 40 is powered off. In step 240, the charger diode 51 becomes inactive and the FET switch 71 turns off. This causes a voltage drop across the main battery diode 75, causing the main battery diode 75 to begin conducting and become active in step 250. Since the voltage level provided to the power bus 90 from the main battery 65 is higher than the bridge battery voltage, the bridge battery diode 61 does not conduct. The main battery then provides power to the power bus 90, so that the portable device can run. The portable device 10 continues to be powered by main battery 65, until the main battery 65 is disconnected from the portable device in step 270. Once the main battery 65 is disconnected, the main battery diode 75 becomes inactive and the bridge battery diode 61 becomes active in step 280. This is because the voltage level on the power bus 90 falls below the voltage level of the bridge battery 95. In step 290, the device 10 enters the low power mode or suspend state, and the bridge battery 95 powers the device 10.

Figure 6:
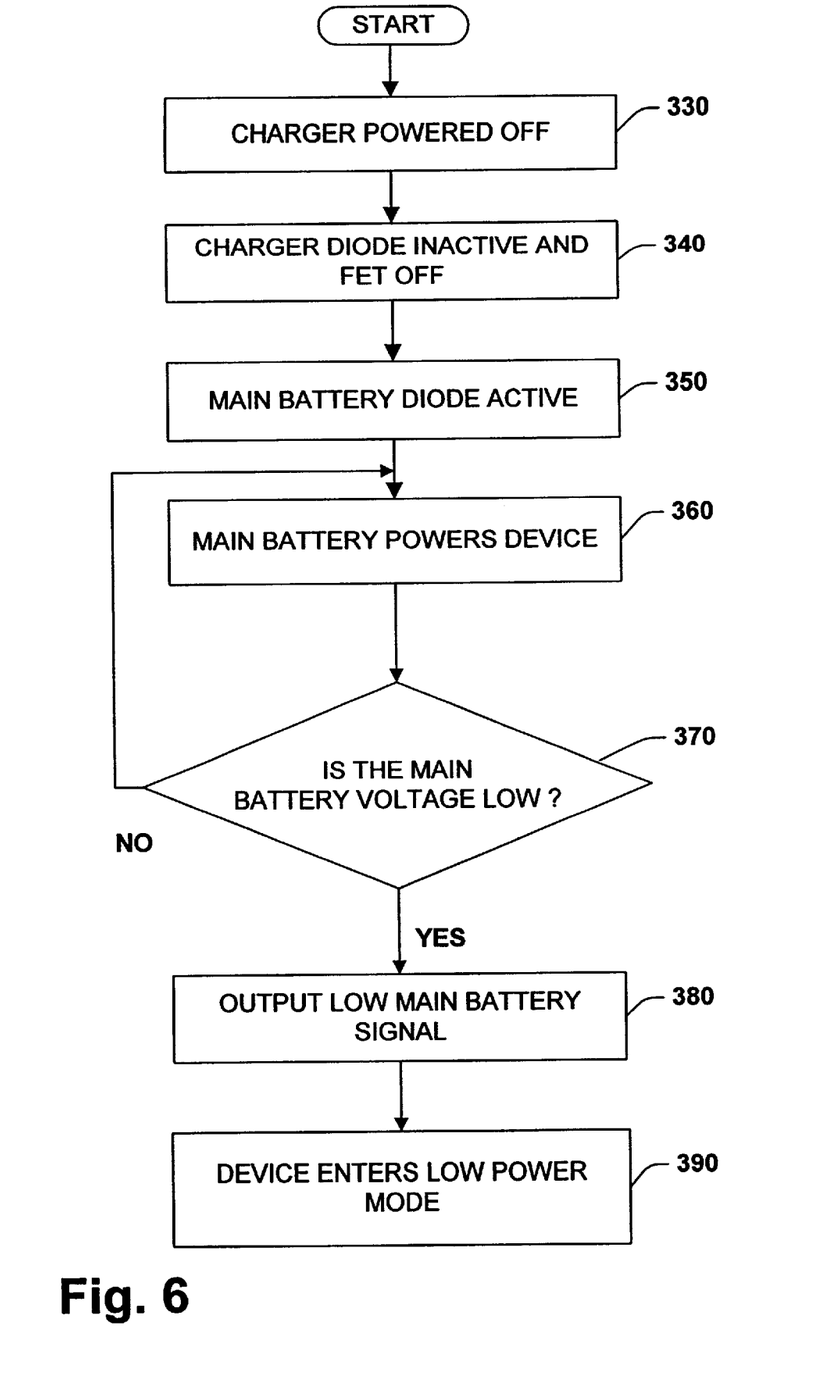
FIG. 6 illustrates a flow diagram for providing a low battery power warning signal to the portable device in accordance with the present invention.

FIG. 6 illustrates the steps taken by the present invention to insure that the main battery 65 provides the proper level of voltage to power the unit power and functional circuitry 55, if the charger 40 is removed. Beginning in step 330, the charger 40 is powered off. In step 340, the charger diode 51 becomes inactive and the FET switch 71 turns off. This causes a voltage drop across the main battery diode 75, causing the main battery diode 75 to begin conducting and become active in step 350. Since the voltage level provided to the power bus 90 from the main battery 65 is higher than the bridge battery voltage 95, the bridge battery diode 61 does not conduct. The main battery 65 then provides power to the power bus 90, so that the portable device can run in step 360. The comparator 85 monitors the voltage level of the power bus 90 to insure that it stays above a predetermined level in step 370. If the voltage is low on the power bus 90, the comparator 85 transmits an output low main battery signal, in step 380, to the device power and functional circuitry 55, so that the device 10 can enter the low power mode in step 390. It should be appreciated that the signal may be coupled to an LED or a display to provide a visual warning to the user of device 10. It should also be appreciated that the device 10 could power down upon detection of a low battery voltage level.

The invention has been described with reference to the preferred embodiments. Obviously, modifications and alterations will occur to others upon reading and understanding the preceding detailed description. It is intended that the invention be construed as including all such modifications alterations, and equivalents thereof.

What is claimed is:

1. A portable electronic device having a power bus for distributing power, the device comprising;
   a rechargeable power source;
   a first switch system coupled to a power bus and the rechargeable power source;
   a second switch system coupled to the power bus; and
   a charging system coupleable to the second switch system, the charging system providing power to the power bus through the second switch system when the charging system is coupled to the second switch system and the rechargeable power source providing power to the power bus through the first switch system when the charging system is not coupled to the second switch system.

2. The device of claim 1, further comprising a bridge power source coupled to the power bus, the bridge power source providing power to the power bus when the charging system is not coupled to the second switch system and the rechargeable power source is one of decoupled from the first switch system and having a voltage level below a predetermined minimum voltage.

3. The device of claim 1, the charging system being adapted to charge the rechargeable power source through the power bus and the first switch system when the charging system is coupled to the second switch system.

4. The device of claim 3, wherein the first switch system includes a diode and a switch coupled in parallel with the diode.

5. The device of claim 4, the switch being a FET.

6. The device of claim 3, further comprising a charge status monitor adapted to monitor the charge level of the rechargeable power source, such that the rechargeable power source is charged by the charging system when the charge level falls below a predetermined charge level.

7. The device of claim 6, the charge status monitor comprising a timer device that causes the charging of the main battery to discontinue after a predetermined amount of time.

8. The device of claim 6, the charge status monitor comprising a current measuring device for monitoring the current drawn from the charging system.

9. The device of claim 3, further comprising a low rechargeable power source monitor adapted to detect a voltage level of the rechargeable power source and output a low power signal if the voltage level of the rechargeable power source falls below a predetermined minimum.

10. The device of claim 9, the low rechargeable power source monitor comprising a comparator circuit coupled at a first terminal to the power bus and coupled to a second terminal by a reference signal.

11. The device of claim 1, the first switch system being a diode and a switch coupled in parallel with the diode.

12. The device of claim 1, the second switch system being a diode.

13. A portable electronic device having a power bus for distributing power, the device comprising;
    a main battery;
    a first switch system coupled to a power bus and the main battery;
    a bridge battery; and
    a second switch system coupled to the power bus and the bridge battery, the main battery providing power to the power bus through the first switch system and the bridge battery providing power to the power bus through the second switch system when the main battery is decoupled from the first switch system.

14. The device of claim 13, the first switch system being a diode.

15. The device of claim 13, the second switch system being a diode.

16. The device of claim 13, further comprising a third switch system coupled to the power bus and a charging system coupleable to the third switch system, the charging system having a voltage level above a voltage level of the main battery and providing power to the power bus when the charging system is coupled to the third switch system.

17. The device of claim 16, the third switch system being a diode.

18. The device of claim 16, the first switch system comprising a switch disposed between the main battery and the power bus, the charging system charging the main battery when the switch is closed and not charging the main battery when the switch is open.

19. The device of claim 13, the first switch system being a diode coupled in parallel with a switch.

20. The device of claim 19, the switch being a FET.

21. The device of claim 13, further comprising a charge status monitor adapted to monitor the charge level of the main battery, such that the main battery is charged by a charging system when the charge level falls below a predetermined charge level.

22. The device of claim 21, the charge status monitor comprising a timer device that causes the charging of the main battery to discontinue after a predetermined amount of time.

23. The device of claim 21, the charge status monitor comprising a current measuring device for monitoring the current drawn from the charging system.

24. The device of claim 13, further comprising a low main battery power monitor adapted to detect a voltage level of the main battery and output a low power signal if the voltage level of the main battery falls below a predetermined minimum.

25. The device of claim 24, the low main battery power monitor comprising a comparator circuit coupled at a first terminal to the power bus and coupled to a second terminal by a reference signal.

26. A method for providing power distribution in a portable electronic device comprising;

coupling a main battery to a power bus through a first diode;

coupling a charging system to the power bus through a second diode; and coupling a bridge battery to the power bus through a third diode, the charging system powering the power bus if the charging system is present, the main battery powering the power bus if the charging system is not present and the bridge battery powering the power bus if the charging system and the main battery are not present.

27. The method of claim 26, further comprising coupling a switch between the power bus and the main battery, the switch having a closed state for charging the main battery with the charging system through the power bus and an open state to terminate charging of the main battery with the charging system.

28. The method of claim 27, further comprising monitoring the charge level of the main battery and discontinuing the charging of the main battery by opening the switch upon reaching a predetermined charge level.

29. The method of claim 26, further comprising monitoring the voltage level of the main battery and outputting a low battery voltage signal when the voltage level falls below a predetermined level.

30. A portable electronic device having a power bus for distributing power, the device comprising;

means for providing power to a power bus, the means for providing power being rechargeable;

means for coupling the means for providing power to the power bus;

means for charging the means for providing power to a power bus; and means for coupling the means for charging to the power bus, the means for charging having a voltage level that is at a predetermined level above a voltage level of the means for providing power causing the means for charging to simultaneously provide power to the power bus and charge the means for providing power.

31. The device of claim 30, further comprising means for providing backup power to the power bus in the event the means for providing power is removed and means for coupling the means for providing backup power to the power bus.

32. The device of claim 30, further comprising means for monitoring the charge level of the means for providing power.

33. The device of claim 30, further comprising means for monitoring the voltage level of the means for providing power.

34. The device of claim 30, further comprising means for enabling and disabling the charging of the means for providing power.

35. A portable electronic device having a power bus for distributing power, the device comprising;

a main battery coupled to a power bus through a first diode;

a charging system coupled to the power bus through a second diode; and a bridge battery coupled to the power bus through a third diode, the charging system having a voltage level above a voltage level of the main battery and the voltage level of the bridge battery being lower than the voltage level of the main battery, such that if the charging system is present the first diode is forward biased and the charging system provides power to the power bus, if the charging system is not present the second diode becomes forward biased and the main battery provides power to the power bus and if the charging system and the main battery are not present the third diode becomes forward biased and the bridge battery provides power to the power bus.

* * * * *